US005506730A

United States Patent [19]
Morley et al.

[11] Patent Number: 5,506,730
[45] Date of Patent: Apr. 9, 1996

[54] FLIP-UP HELMET MOUNT FOR NIGHT VISION GOGGLE

[75] Inventors: Roland M. Morley, Tempe; O'Dell M. Keil, Phoenix; Curtis B. Keepers, Mesa; Roy K. Fischer, Scottsdale, all of Ariz.

[73] Assignee: Litton Systems, Inc., Woodland Hills, Calif.

[21] Appl. No.: 119,411

[22] Filed: Sep. 9, 1993

[51] Int. Cl.⁶ ............................... G02B 7/02; G02B 23/00
[52] U.S. Cl. .................. 359/815; 359/407; 359/409; 250/214 VT; 2/6.2; 2/6.7; 2/422
[58] Field of Search ........................... 359/815, 407, 359/409, 817, 818; 250/214 VT; 2/6.2, 6.7, 422

[56] References Cited

U.S. PATENT DOCUMENTS

| | | | |
|---|---|---|---|
| 4,449,787 | 5/1984 | Burbo et al. | 313/524 |
| 4,672,194 | 12/1985 | Kastendieck et al. | 250/214 VT |
| 5,331,684 | 7/1994 | Barin et al. | 359/409 |

Primary Examiner—Georgia Y. Epps
Assistant Examiner—Michael A. Papalas
Attorney, Agent, or Firm—Poms, Smith, Lande & Rose

[57] ABSTRACT

A flip-up helmet mount for a night vision goggle includes a plurality of nested relatively movable brackets, the first of which is secured to a user's helmet. A second bracket pivots relative to the first to provide flip-up motion for the night vision goggle, and a third of the nested brackets is pivotal on the second bracket to provide a tilt angle adjustment for the night vision viewer. In order to both save battery power, and to prevent the user from inadvertently revealing his position by forgetting to turn off the night vision viewer before flipping it up, the support structure includes a magnetic flux source cooperable with a magnetically-responsive switch of the night vision viewer to maintain the viewer turned on only when the viewer is in its use position. When the viewer is flipped toward its upward position, the magnetic flux source is responsive to a combination of gravitational force and centrifugal force to move away from the magnetically-responsive switch device and effect turning off of the viewer. Because the viewer remains mounted on the flip-up mount during this series of events allowing the user an unobstructed natural view of the environment, the viewer is immediately available to be flipped downwardly to its use position to be placed back into operation. The gravitationally-responsive magnetic flux source moves back into association with the magnetically-responsive switch when the viewer is returned to its use position.

27 Claims, 4 Drawing Sheets

FLIP-UP HELMET MOUNT FOR NIGHT VISION GOGGLE

BACKGROUND OF THE INVENTION

1. Field of the Invention

The present invention relates to night vision devices. More particularly, the present invention relates to a flip-up helmet mount for a night vision goggle of the type which removably and relatively movably attaches to a helmet worn by a user of the device. The flip-up mount secures to the helmet to thereby support the night vision goggle in front of the user's eyes. As thus supported, the night vision device may be used by the wearer of the helmet to view a night scene while the user's hands remain free. Also, the helmet mount is provided with a device which is responsive to a combination of gravity and a particular movement of a portion of the helmet mount during flipping up of the goggle to automatically turn off the night vision goggle.

2. Related Technology

Conventional night vision devices are known which removably attach to a support structure secured to a helmet or face mask. These conventional night vision devices are relatively movable by manipulation of the support structure to align at least one eye piece of the night vision device with at least one eye of the user. Additionally, the support structure and night vision device are conventionally provided with cooperating structural features which insure that the night vision device is electrically deactivated when it is removed from the support structure. This conventional feature which turns off the night vision device when it is removed from the support structure prevents the battery pack of the device from being inadvertently exhausted by leaving the night vision device on when it is not in use on the support structure.

A conventional night vision device which includes features turning off, or removing electrical power supply to, the night vision device when the latter is moved to a flipped-up position is seen in U.S. Pat. No. 4,449,787, issued 22 May 1984, to James H. Burbo, et al. The teaching of the Burbo patent is believed to include the provision of a pair of recesses on a first part of the support structure attached to a helmet. A second part of the support structure is secured to the night vision device and includes a pair of pins receivable into the pair of recesses to pivotally attach and support the night vision device. Electrical contact between the night vision device and its battery pack is made through the engagement of the two parts of the support structure only when the night vision device is pivoted to its use position. Thus, when the night vision device is pivoted upwardly to allow the user unobstructed vision, power supply to the night vision device is interrupted. Thus the available power is conserved, and the night vision device is not inadvertently left on when not in use.

However, the support structure and electrical power interruption features of the Burbo device necessarily result in conduction of electrical power to the night vision device by way of electrical contacts which are exposed. In effect, these exposed contacts are switch contacts because they close and open in response to the pivotal movement of the night vision device between its use and flipped-up positions. As a first consideration, such exposed electrical switch contacts are highly subject to damage which can interfere with the conduction of electrical power to the night vision device. Secondly, deterioration of the electrical switch contacts can result from environmental factors. That is, environmental factors may cause corrosion, oxidation, and other deterioration of such exposed electrical contacts. These deteriorations of the electrical contacts may includes such undesirable effects as pitting, the formation of nonconductive oxide coatings, the introduction of environmental dust and dirt into the contact interface, and the formation of other films or coatings on the exposed contacts. Of course, all of these environmental effects are detrimental to the reliable conduction of electrical power to the night vision device. The result is that such exposed electrical contacts switch contacts compromise the service reliability of the night vision device, and cause the device to be frail instead of rugged and able to withstand the handling to which such devices are subjected in their use environment.

Another conventional night vision device is known in accord with U.S. Pat. No. 4,672,194, issued 9 Jun. 1987, to William A. Kastendieck, et al. This Kastendieck patent is believed to teach a night vision device which includes a head gear, and a night vision goggle. The goggle includes a power supply circuit having a magnetically-responsive switch in series with a bi-stable latching relay controlling power supply to the image intensifier tube of the goggle. This magnetically-responsive switch is arranged to remain closed, and to keep the power supply relay closed, so long as the switch is subjected to a sufficient magnetic flux. The head gear for the night vision device includes a permanent magnet disposed so that it is close to the magnetically-responsive switch when the goggle is on the head gear. When the goggle is removed from the head gear, the magnetically-responsive switch is moved away from the permanent magnet so that the switch opens, an electrical pulse moves the bi-stable relay to an open condition, and electrical power to the night vision goggle is interrupted. Thus, the goggle is prevented from inadvertently being left on when it is removed from the head gear and is not in use. Also, it is recognized that inadvertently leaving the night vision goggle on when it is not in use can attract the attention of hostile personnel to the phosphor yellow/green light emitted from the eyepieces of the goggle.

However, the night vision device according to the Kastendieck patent does not provide for the night vision goggle to be pivoted to a flipped-up position while yet supported on the head gear. In order to obtain an unobstructed view with the unaided eyes, a user of the Kastendieck device must remove the night vision goggle from its position on the head gear in front of the user's eyes.

Another factor to be considered with night vision devices like those taught by Burbo and Kastendieck is the severe use environment in which the devices may be used, along with the high reliability required from the devices in these severe use environments. The use environments for night vision devices may include police use or combat conditions in which heat, cold, moisture, dust, dirt, bumping, impact, and rough handling of the night vision devices by the users are common. Yet, despite these severe use conditions, the reliability of the night vision devices should be very high. In other words, the devices should be rugged in order to function reliably in such environmental conditions and after such rough handling. Also, the operative mechanisms should be simple, rugged, straight forward, and direct acting in their principles of operation, while still accomplishing the desired operational aspects for the devices. The environmental factors of moisture, dust, and dirt must be sealed out of the operating mechanism, or allowances made for proper operation of the devices despite such environmental contaminants in the devices. In view of these factors, the frail devices like that taught by Burbo fall far short of the operational robustness required for night vision devices. The device taught by Kastendieck is deficient in its operational aspects because, among other reasons, it cannot be flipped up to allow the user an unobstructed natural view while keeping the user's hands free.

SUMMARY OF THE INVENTION

In view of the above, a primary object for the present invention is to provide a flip-up helmet mount for a night vision goggle which is strong, rugged and reliable, and which includes a device for automatically turning off the night vision goggle in response to flipping up of the goggle while allowing the user freedom of head movement without unintended interruption of the night vision provided by the goggle.

Another object for the present invention is to provide a flip-up helmet mount for a night vision goggle in which the device for automatically turning off the goggle when the latter is flipped up is environmentally isolated to be free of interference with its operation by moisture, dust, and dirt, for example.

Still another object for the present invention is to provide such a flip-up helmet mount for a night vision goggle in which the flip-up hinge structure is relatively free moving but also provides a desirable degree of pivotal friction so that the goggle does not fall freely in the event that the user neglects to fully raise the goggle into its flipped-up position.

Yet another object for the present invention is to provide such a flip-up helmet mount for a night vision goggle which is easily and inexpensively adapted for use on a variety of helmets.

Another object for the present invention is to provide a flip-up helmet mount for a night vision goggle which mounts to the helmet using a minimum of securing structures which are easily and quickly attached and detached from the helmet, and yet which is securely and reliably attached to the helmet.

Accordingly, the present invention provides a flip-up helmet mount for a night vision goggle having a first bracket which secures to the helmet with a broad-based hook-like member engaging the brim of the helmet, and defining abutment surfaces engaging the front surface of the helmet, and engaging a with a single tension strap member extending to the rear edge of the helmet to engage this rear edge with a hook; the first bracket defines a transverse boss in which is pivotally and frictionally carried a bushing member, the bushing member is drivingly engaged by a second bracket member which includes a pair of spaced apart flanges straddling the first bracket member, for flip-up movement relative thereto with pivoting of the bushing member in the boss, near their forward ends the pair of flanges of the second bracket member are joined to one another by a web, a third bracket member likewise includes a pair of flanges which straddle and lie adjacent to the pair of flanges of the second bracket member, the second bracket member pivotally carries the third bracket member and also carries a locking member which passes through the bushing member and actuate slots in the pair of flanges of the third bracket member, this locking member clamps the second and third bracket members together in a selected position of tilt relative to the user's helmet, the flanges of the third bracket member are also joined to one another by a respective web for simultaneous tilting movements and each carries one of a pair of forwardly extending guide ways upon which is slidably received a carriage member, this carriage member defines a socket into which a tang portion of a night vision goggle is receivable, also the carriage member carries a magnetic device effective to retain the night vision goggle activated, this magnetic device is responsive to gravity and flip-up movement of the goggle to turn off the goggle.

An advantage of the present invention resides in the improved user safety resulting from automatically turning off the night vision goggle whenever it is flipped to its up position, and thereby extinguishing the yellow/green phosphor light emission from the eye pieces of the night vision goggle. In this up position of the night vision goggle, the eye pieces of the goggle are disposed forwardly of the user and possibly toward hostile personnel. Were the night vision goggle left on, its yellow/green phosphor light emissions could provide an aiming point for these hostile personnel.

Additionally, in its flipped-up position, the night vision goggle is above the user's line of sight. Thus, even if a warning light were provided on the exterior of the goggle to indicate to the user that the goggle had been left on, this warning light might easily be missed by the user. Additionally, such a warning light could possibly give away the user's position even when the goggle was in its lowered use position.

Also, the magnetic device is advantageously sealed from the use environment so that moisture, dust, and dirt cannot enter to interfere with the operation of this important safety mechanism.

Still further, the magnetic device has only a single moving part which relies upon a combination of gravitational force and centrifugal force resulting from the flipping-up movement of the night vision goggle to insure positive movement of the magnetic device to turn off the goggle.

Advantageously, the required combination of gravitational and centrifugal forces necessary to effect a turning off of the night vision goggle are not likely to occur during wearing and use of the goggle, even it the user bows or raises the head to look vertically down or vertically up, respectively.

Another advantage resides in the ease with which the present flip-up helmet mount can be attached to a helmet. That is, only a single broad-based hook structure need be engaged with the helmet brim with the first bracket member engaging the helmet front surface. Next, the tension strap is hooked to the helmet rear edge, and drawn tight with an over-center buckle. Removal of the flip-up helmet mount from a user's helmet is the reverse of the above.

Finally, an important advantage of the present invention resides in the inherently strong, rugged structure implementing the present invention. This structure, by its design well withstands the rigors of the severe use environment in which such night vision goggles are used commonly. As a result, users of the invention benefit from an increased availability of the night vision goggles, and decreased risk that their goggles will by unusable or have their utility of use compromised by some failure of the helmet mount structure used with the goggles.

Additional objects and advantages of the present invention will be apparent from reading the following description of a particularly preferred exemplary embodiment of the present invention, taken in conjunction with the appended drawing Figures, in which like reference numerals designate the same feature or features which are analogous in structure or function:

DESCRIPTION OF THE DRAWING FIGURES

FIG. 1 provides a fragmentary perspective view of a user wearing a helmet carrying a flip-up helmet mount, which helmet mount supports a night vision goggle in front of the user's eyes;

FIG. 2 is a side elevation view of the user with helmet, helmet mount, and night vision goggle seen in FIG. 1;

FIG. 3 provides a fragmentary cross sectional view taken along the plane 3—3 of FIG. 1, and looking in the direction of the arrows;

Figures 1, 2:
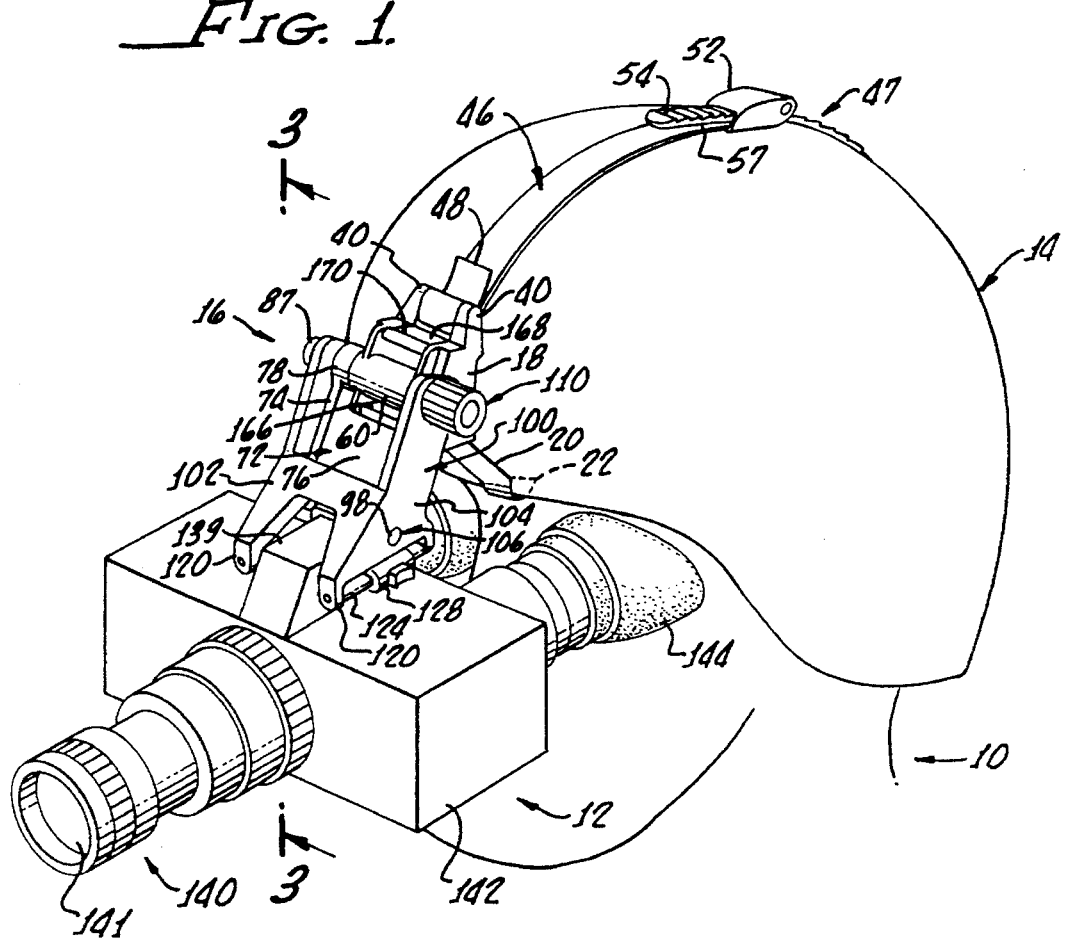
Figure 3:
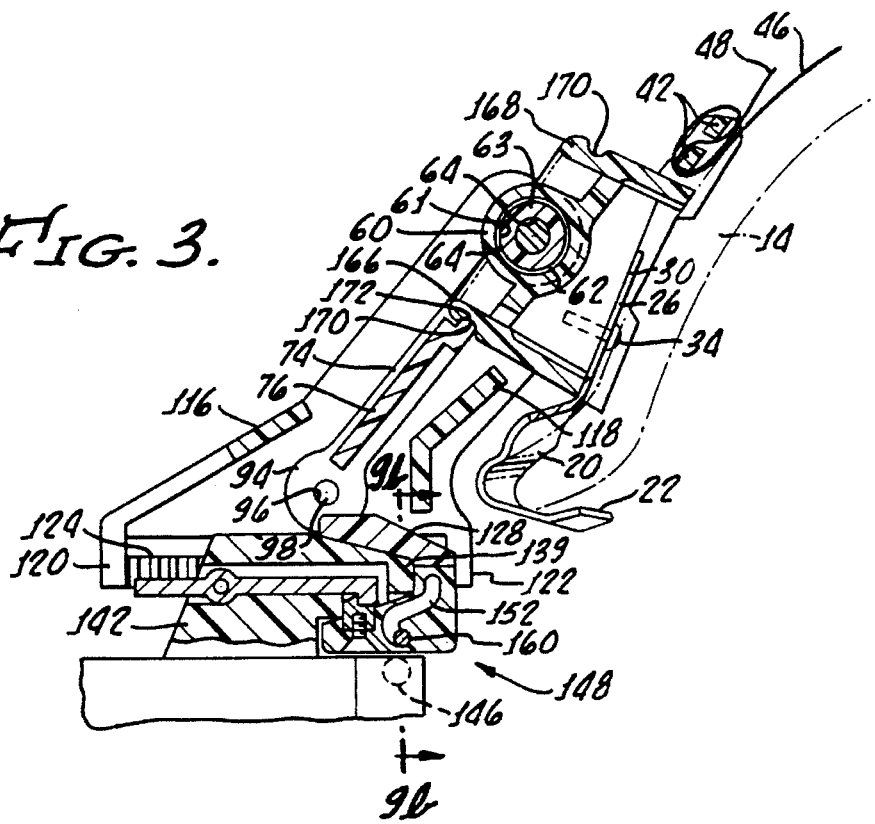
Figure 4:
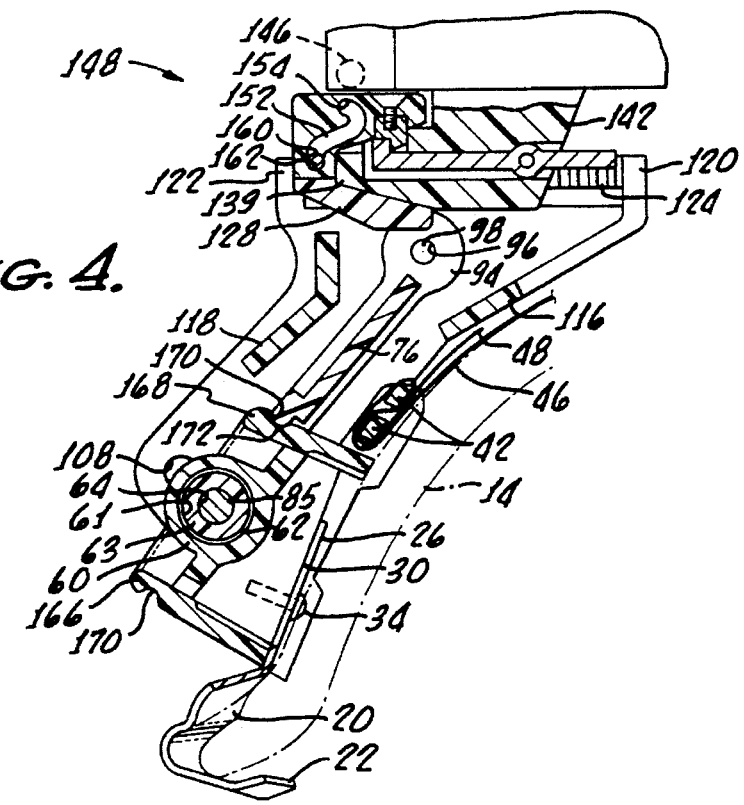
FIG. 4 is a fragmentary cross sectional view like FIG. 3, and taken at the same plane, but with the helmet mount in an alternative operating position.
Figure 9A:
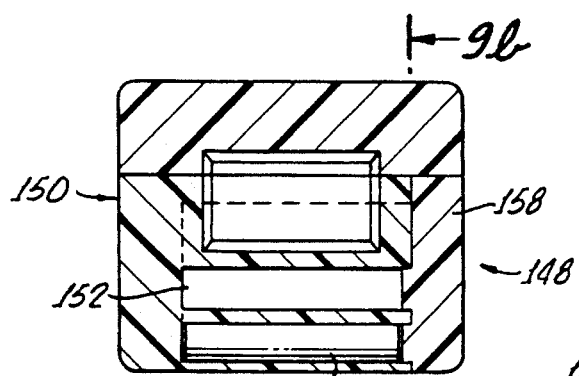
Figure 9B:
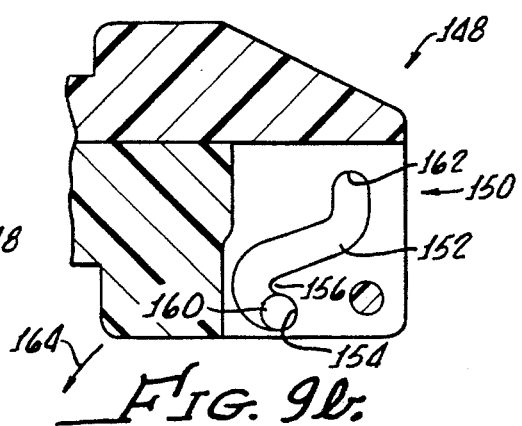
Figure 7:
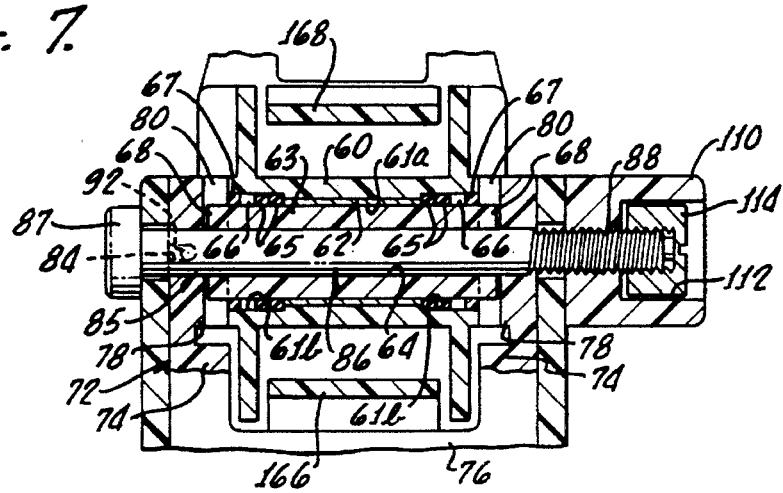
Figure 8:
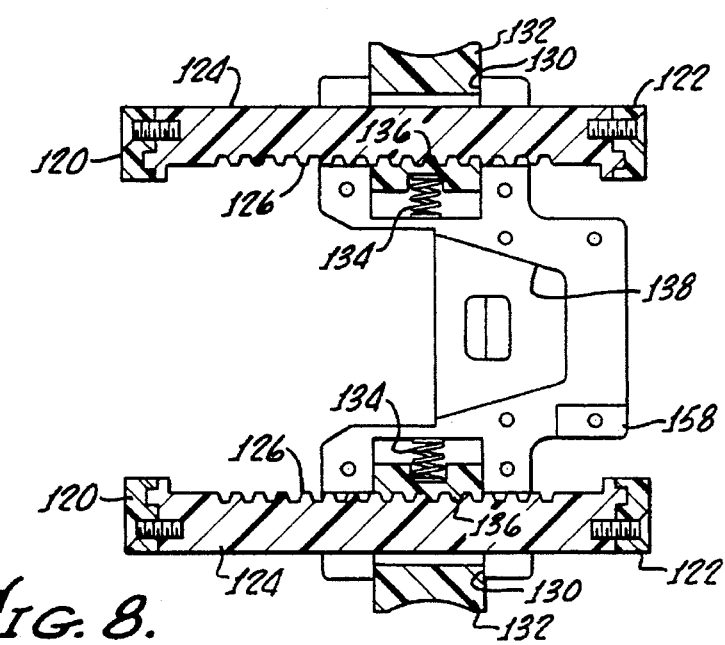
Figure 10:
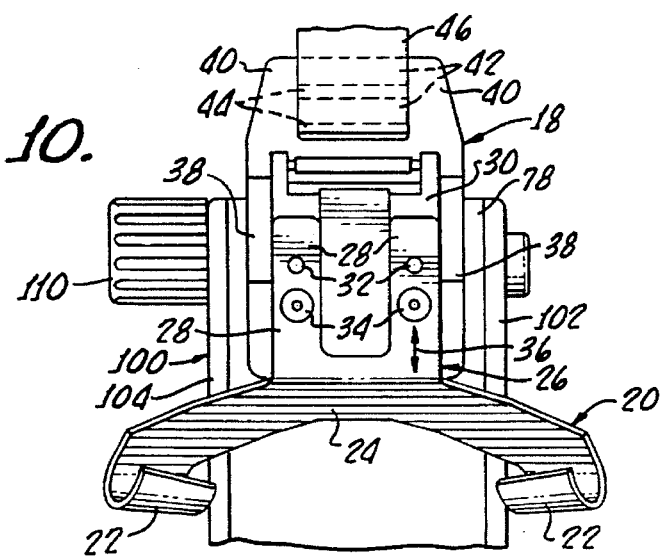

FIG. 7 presents a fragmentary cross sectional view taken along line 7—7 of FIG. 2, and looking in the direction of the arrows;

FIG. 8 provides an enlarged fragmentary cross sectional view taken along line 8—8 of FIG. 2, and looking in the direction of the arrows;

FIG. 9a is an enlarged fragmentary cross sectional view taken along line 9—9 of FIG. 3, and looking in the direction of the arrows;

FIG. 9b is a cross sectional view taken at line 9b–9b of FIG. 9a, looking in the direction of the arrows, and is similar to a portion of FIGS. 3 and 4 shown at an enlarged size; and FIG. 10 is an enlarged rear elevation view of the helmet mount seen in the other drawing Figures.

DESCRIPTION OF THE PREFERRED EMBODIMENT OF THE INVENTION

Referring to all of the drawing Figures in conjunction with one another, and especially referring first to FIGS. 1, 2, and 10 in conjunction, a human operator 10 is shown using a night vision device 12. The operator 10 wears a helmet 14 carrying a flip-up helmet mount, generally referenced with the numeral 16. This flip-up helmet mount 16 includes a first bracket member 18 securing to the helmet 14 with a broad-based hook member 20 (best seen viewing FIG. 10). This hook member includes a pair of laterally spaced apart hook portions 22 which are defined at respective ends of a cross bar portion 24 of the hook member. These hook portions 22 engage under the brim of the helmet 14, as is best seen viewing FIG. 1. This hook member 20 also includes a flange portion, generally referenced with the numeral 26, which is removably and adjustably secured to the first bracket member 18 to attach the hook member 20 thereto.

The flange portion 26 takes the form of a pair of vertically extending arms 28 which are spaced laterally apart to abut corresponding mounting surfaces 30 of the first bracket member 18. Each one of these pair of arms 28 defines an upper and a lower one of two vertically spaced pairs of holes 32, the respective lower pair of which receives the pair of screws 34, as seen in FIG. 10. The screws are threadably received by corresponding holes (not shown) of the first bracket member 18. Because the hook member 20 may be vertically adjusted relative to the first bracket member 18 by placing the pair of screws 34 in either the upper or lower pair of holes 32, and the hook member 20 secures to the helmet 14 at its brim, the first bracket member has an increment of vertical adjustment relative to the helmet 14, as is indicated by arrow 36, viewing FIG. 10.

Viewing FIG. 10 in conjunction with FIGS. 1 and 2, it is seen that the first bracket member 18 defines an abutment surface 38 engaging the outer front surface of the helmet 14, as is best seen in FIG. 1. At its upper extent, the first bracket member includes a pair of upwardly extending arms 40 carrying a pair of spaced apart cross bars 42. The cross bars 42 cooperate with the arms 40 and the remainder of the first bracket member 18 to define a pair of slots 44. Received through the slots 44 and around the cross bars 42 in a self-cinching serpentine path is a web strap portion 46 of an elongate strap assembly 47. A free end 48 of the strap 46 is available above and behind the first bracket member 18 to tighten the mounting of the flip-up helmet mount 16 on the helmet 14, as will be explained.

At a rear end 50 of the strap 46, a pawl member 52 is secured to the strap. This pawl member 52 receives the end of an elongate rachet tongue member 54. Spaced along the length of the rachet tongue member 54 is a plurality of rachet teeth 57, each of which is engageable with the pawl member 52 to selectively alter the length of the strap assembly 47. At the rear of the rachet tongue member 54 is secured an over-center buckle assembly, referenced with the numeral 56. This bucket 56 carries at its aft end a hook portion 58 which engages the helmet 14 at its rear edge, as is seen in FIG. 2.

Returning to a consideration of FIGS. 1 and 2, it is seen that the first bracket member 18 defines a transverse boss 60 having a transverse stepped through bore 61 therein (best seen in FIGS. 3, 4 and 7). This stepped through bore 61 includes a smaller diameter center bore portion 61a, and larger diameter end bore portions 61b. A bushing member 62 is non-rotationally received in the center bore portion 61a. Rotationally received in the bushing member 62 is a cylindrical journal member 63 having a through bore 64. About the journal member and within each of the bore portions 61b is received first a pair of elastomeric O-ring members 65, then a felt washer 66, and finally a Delrin washer 67. The sizing of the bore portion 61b, journal member 63, and O-rings 65 is such that the latter are radially distorted to frictionally engage between the boss 60 and journal member 63. The Delrin washers 67 serve as shield washers to exclude large dust particles from the bore 61, while the felt washers 66 exclude five environmental dust particles. Consequently, the O-ring members 65 provide a smooth frictionally-controlled pivotal motion of journal member 63 in the bore 61, and a smooth controlled flip-up motion for the night vision device 12. That is, the journal member 63 includes an axially projecting interrupted key 68 at each end. As will be seen, the night vision device 12 is coupled with the journal member 63 in such a way as to be restrained from a pivotal free fall toward its use position should the operation 10 not detent the viewer in its flipped-up position.

Coupled with and carried by the journal member 63 is a second bracket member 72. This bracket member 72 includes a pair of spaced apart flange portions 74, which are coupled together by a transverse web portion 76. At their proximal ends, the flange portions 74 each define an inwardly extending boss portion 78 (seen in FIG. 1). These boss portions 78 each define a key way 80 (seen in FIG. 7) and one of a pair of transversely aligned bores 2. One of the bosses 78 also defines an outwardly disposed slot 84 traversing the respective bore 82 (as is best seen in FIG. 7 shown in dashed lines). The bosses 78 of the second bracket member 72 are aligned with the journal member 63, so that the keys 68 are received into the key ways 80. Received through the bores 82 of the second bracket member and through the aligned bore 64 of the journal member 63 is a clamp pin 85. This clamp pin 85 includes a central cylindrical section 86 separating opposite head 87 and threaded end 88 sections. Adjacent the head section 87, the clamp pin 85 carries a cross pin 92 which is received in the slot 84. Consequently, the clamp pin is non-rotational in the bores 64, 82, but has a limited degree of axial freedom of movement in these bores.

At the distal end of the second bracket member 72, each of the flanges 74 defines a respective ear portion 94 (seen in FIGS. 3 and 4) having a threaded bore 96. Threadably received into the bores 96 are a pair of shoulder screws 98. The shoulder screws 98 pivotally carry a third bracket member 100. This third bracket member 100 also includes a pair of spaced apart flange portions 102, 104 which straddle and are adjacent to the flanges 74 of the second bracket member 72. That is, each of the flange portions 102, 104 defines a respective through bore 106 pivotally receiving one of the shoulder screws 98. At the clamp pin 85, the flanges 102,104 each define an arcuate slot 108, which are of sufficient dimension to pass the cross pin 92. The clamp pin 85 is passed into the bores 64, 82 by first inserting the thread section 88 through the arcuate slot 108 of flange portion 102. Cross pin 92 passes through the slot 108 to be received into slot 84 of one of the bosses 78 to non-rotationally receive the clamp pin 85. On the threaded section 88 of the clamp pin 85, a respective locking knob 110 is threadably carried and engages it and the head section 86 with the corresponding flange portion 102, 104 of the third bracket member 100 to retain this bracket member in a selected pivotal position or tilt position relative to the second bracket member 72. Within a respective counter bore 112 of the locking knob 110, a retention member 114 is received, and is secured essentially non-removably to the clamp pin 85. That is, the retention member 114 may define a threaded blind bore (viewing FIG. 7) and be threadably received on the clamp pin 85 with a thread locking material to prevent removal of the knob 110 except with the use of tools and deliberate force sufficient to break the thread locking material.

Generally above and generally below the second bracket member 72, the third bracket member 100 includes a pair of webs 116 and 118, respectively, which connect and are integral with the flanges 102,104. These webs 116, 118 unite the flanges 102, 104 for pivotal motion in unison about the shoulder screws 98. As the flanges 102, 104 pivot on the shoulder screws 98, the portion of these flanges adjacent to the clamp pin 85 sweep past this clamp pin so that this pin traverses the arcuate slots 108.

Both in front of and behind the pivot screws 98, the flanges 102,104 each define a pair of depending ears 120, 122. A pair of guide ways 124 extend between the pairs of ears 120, 122. These guide ways 124 each define plural inwardly disposed teeth 126 spaced along their length (viewing FIG. 8). Slidably received on the guide ways 124 is a carriage member 128. The carriage member 128 defines a laterally extending pair of recessed 130, each of which slidably receives a release bottom member 132, a portion of which extends outwardly of the recess 130 to be exposed on the carriage member 128. A respective spring 134 urges each of the release button members 132 outwardly so that respective teeth 136 thereof engage the teeth 126 of the guide ways 124. This carriage member 128 also defines a forwardly opening wedge-shaped recess 138 which receives a rearwardly extending tang 139 (only a portion of which is visible in the drawing Figures) of the night vision device 12.

The night vision device 12 includes a conventional night vision viewer 140, which as illustrated, takes the form of an AN/PVS-7B goggle. This night vision goggle 140 includes a single objective lens 141, a housing 142, and a pair of eye pieces 144 aligned with respective eyes of the operator 10. To use the night vision goggle 140, the operator 10 places it in the use position depicted in FIGS. 1, and 2, and looks into eye pieces 144 to see an enhanced image representative of the low-level light from a night time scene which has entered objective lens 141. As those ordinarily skilled in the pertinent arts will appreciate, the night vision goggle 140 includes a power supply in the form of a battery pack internal to the housing 142. Internally of the night vision viewer, a power supply circuit provides power to an image intensifier tube, which is well known in the pertinent arts, and which supplies to the eye pieces 144 an intensified image in phosphor yellow/green light of the night time scene viewed via the objective lens 141. Also, the power supply circuit includes a magnetically-responsive sensor or switch, which is schematically indicated at 146 on FIG. 2. This sensor or switch 146 maintains electrical power supply to the goggle 140 once it is turned on by the operator 10 only so long as a magnetic field of sufficient strength is supplied to the switch 146, similarly in operative concept to that described above with reference to the Kastendieck patent.

However, as is illustrated in FIG. 4, the flip-up helmet mount 16 allows the operator 10 to flip up the night vision goggle 140 to a second position in which the goggle 12 is above the line of sight of the operator 10. This flipped-up position of the night vision viewer allows the operator completely unobstructed vision with unaided eyes. As FIG. 4 clearly shows, however, should the operator 10 forget to turn off the night vision goggle 140 before moving it to its flipped-up position, the phosphor yellow/green light emitted from the eyepieces 144 would be visible to possibly hostile personnel forwardly of the operator 10. This phosphor yellow/green light would appear as a pair of small yellow/green spot lights, and would be visible for a distance of several kilometers at night under battle field conditions.

Accordingly, in order to provide the necessary magnetic flux to the switch 146 while at the same time insuring that the magnetic field is removed from the switch 146 when the goggle 140 is pivoted to its flipped-up position, as depicted in FIG. 4, the flip-up helmet mount 16 includes a device (generally referenced with the numeral 148) which is responsive to a combination of gravity and centrifugal force effective during the flipping-up movement of the night vision goggle to turn the latter off. However, as will be explained, the device 148 allows complete freedom of head movement for the operator 10 without false turn offs of the goggle 140.

Viewing now FIGS. 2, 3, 4, 9a, and 9b in conjunction, it is seen that the device 148 includes a dependent housing portion 150 of the carriage member 128. The housing portion 150 is located immediately above the magnetically responsive switch or sensor 146 of the night vision goggle 140, as is seen in FIGS. 2 and 3. This housing portion defines a S-shaped laterally and vertically extending cavity 152 (a backwards S-shape as seen in these drawing Figures). The cavity 152 is perhaps more accurately described as question mark shaped (?), although the question mark is only right side up when the flip-up mount is inverted in its flipped up position seen in FIG. 4. The cavity 152 in longitudinal cross section includes a re-entrant cove portion 154, which is analogous to the top curlicue of the question mark shape. This cove portion 154 is separated somewhat from the remainder of the cavity 152 by a protruding lip feature 156. As is seen in FIGS. 3 and 9b, the cove 154 is at the bottom of the cavity 152 when the flip-up mount 12 is in its use position. The cavity 152 is closed at one end by a cover part 158 of the housing portion 150, viewing FIG. 9a.

Figure 5:
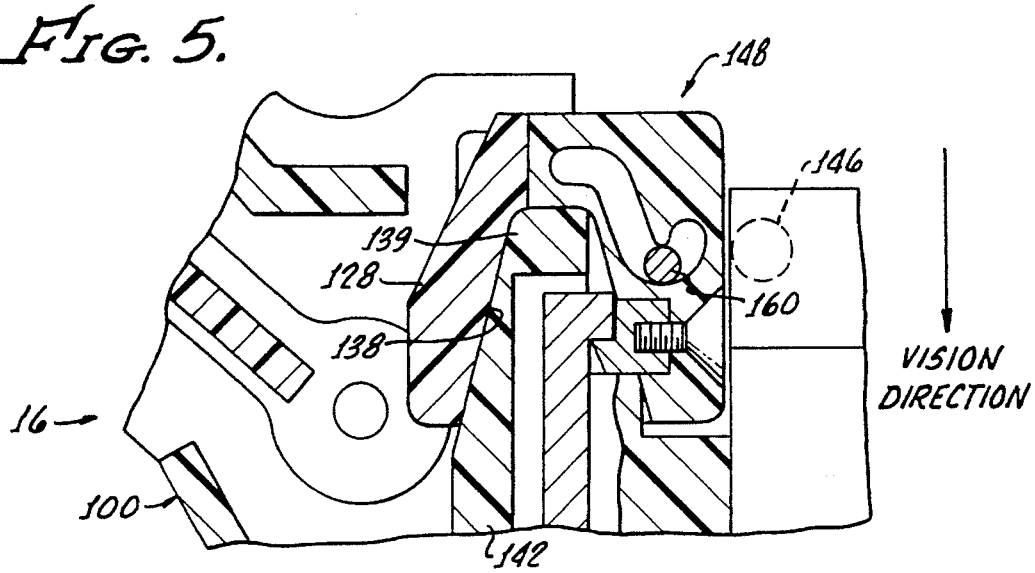
FIGS. 5 and 6 are fragmentary cross sectional views similar to FIG. 4, but showing only a portion of a portion of the structure seen in the preceding drawing Figures, and depicting the structure in alternative orientations with respect to the vertical.
Figure 6:
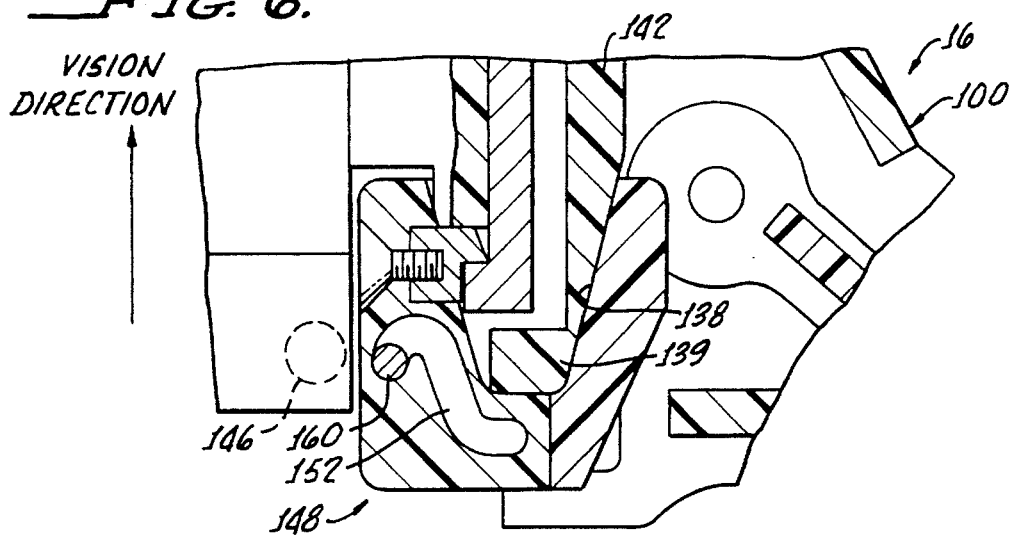

Movably received in the cavity 152 is an elongate round cylindrical bar magnet member 160. This bar magnet member 160 provides sufficient magnetic flux to the sensor 146 to keep the night vision goggle 140 turned on so long as the magnet member 160 is in or immediately adjacent to the re-entrant cove portion 154 of the cavity 152, viewing FIGS. 3 and 9b. As FIG. 5 illustrates, if the user 10 turns his head to look vertically downwardly, the bar magnet 160 rolls to the bottom of the cavity 152, and remains adjacent to the re-entrant cove 154 because the cavity 152 is angulated rearwardly and upwardly relative to the user 10 and with respect to the horizontal. FIG. 6 similarly shows that even should the user turn his head upwardly entirely to a vertically upward direction of view, the bar magnet 160 will be retained in the cove portion 154 by the protruding lip 156. Consequently, the night vision viewer 140 will be maintained on regardless of the head movements made by the user 10.

However, as FIG. 4 shows, when the user flips up the night vision goggle, the carriage member 128 is essentially inverted, and the bar magnet 160 will be gravitationally moved out of and away from the cove portion 154 of cavity 152. The bar magnet member 160 is moved to an opposite end portion 162 of the cavity 152 which is sufficiently far from the sensor 146 that the night vision goggle 140 is turned off. FIG. 4 shows that the bar magnet 160 is moved to the end 162 of cavity by gravity alone if the flipping-up motion of the goggle 140 is done slowly. That is, the angular movement of the goggle to its flipped-up position shown in FIG. 4 is sufficient that the round bar magnet member 160 will roll over the lip 156, and will then fall to the other end 162 of this cavity. However, in the usual conditions of use of the night vision goggles 140, the flipping-up motion of the goggle would be just that—a quick flip-up motion. During such a quick flip-up motion, the night vision goggle 140 and the carriage 128 move in an arc centered at the bore 61 of boss 60.

Consequently, a centrifugal force is effective on the bar magnet member 160, as is indicated on FIG. 9b with the arrow 164. This centrifugal force is effective to assist in quickly dislodging the bar magnet member 160 from the cove portion 154, and to start this round bar magnet member rolling around the curlicue of the cavity 152 toward the opposite end 162. This combination of centrifugal force and the changing orientation of the cavity 152 with respect to gravity during the flip-up motion is effective to very quickly move the bar magnet member 160 away from the sensor 146, turning off the night vision goggle 140. This early moving of the bar magnet 160, and early turning off of the night vision device 12, has a great tactical advantage in many use conditions for the night vision device 12. That is, as soon as the night vision device 12 is started in its flip-up motion away from the user's eyes, the eyecups 144 come away from the user's face, which is then illuminated by the yellow/green light from these eyepieces. Potentially hostile personnel forward of the user may be alerted to the user's presence by this illumination. However, this light is for the most part blocked by the body of the night vision device itself. Also, the night vision device in its flip-up motion is on its way to a position (FIG. 4) in which the eyepieces 144 face toward the potentially hostile personnel. The light from the eyepieces 144 must be extinguished as soon as is possible in this flip-up motion to insure that little or no light is projected toward the hostile personnel. The early movement of the bar magnet member 160 of the present invention by a combination of gravitational and centrifugal forces effects this early turning off of the night vision device.

As a result, by the time the goggle 140 reaches its flipped-up position depicted in FIG. 3, the phosphor yellow/green light from the eye pieces 144 has been extinguished. Thus, the user 10 enjoys a much improved safety in the use of the night vision device 10, while still enjoying the convenience in use which is afforded by a flip-up mount. That is, the night vision viewer 32 is immediately available for its next use simply by flipping it down from the position of FIG. 3 to the use position illustrated by FIGS. 1 and 2. During this return to the use position, the bar magnet member 160 rolls from end 162 of the cavity 152 back to the curlicue end adjacent to and into the cove portion 154. Thus, when the user engages the switch of the goggle 140 to initially turn it on, this goggle stays on under the influence of magnet 152 acting on sensor 146.

The user 10 need not remove the night vision goggle 140 from its mount in order to have clear, unobstructed vision with the unaided eyes. Further, the operator 10 need not remember to turn off the goggle 140 each time a view with the unaided eyes is desired. Simply moving the goggle 140 up to its flipped-up position will safely extinguish the phosphor yellow/green illumination from the eye pieces 144, as well as saving battery power by turning off the goggle 140.

In order to provide retention of the night vision goggle 140 in either of its use or flipped-up positions, the first bracket member 18 includes a pair of laterally and forwardly extending yieldably shape retaining tongue portions 166, 168. These tongue portions are arranged as an upper tongue and a lower tongue, one on each side of the boss 60. Each of these tongue portions 166, 168 defines a respective one of a pair of transverse grooves 170. The web portion 76 of the second bracket member 72 includes a laterally elongate rib part 172 extending toward the boss 60. This rib 172 is receivable into either one of the grooves 170 to releasably retain or detent the second bracket member in either the use position of FIGS. 1, 2, and 3, or in the flipped-up position of FIG. 4. The second bracket member 72 moves through an angular movement of substantially 180 degrees between its use and flipped-up positions.

In the use of the flip-up helmet mount 16, the operator 10, engages the hook member 20 with the brim of his helmet 14 with the abutment surfaces 38 of the first bracket member 18 in engagement with the front of the helmet, extends the strap assembly 47 to the rear of the helmet, and hooks the hook member 58 at the rear edge of the helmet. The ratchet tongue member 54 in combination with the adjustability of strap 46 at cross bars 42 is used to adjust the length of the strap assembly 47 for a snug fit on various sizes of helmets. Final tightening of the flip-up mount 16 is effected with the over-center buckle portion 56.

As illustrated, the flip-up mount 16 is shown in use on the standard U.S. Army Kevlar composite helmet. However, the flip-up mount 16 can easily and inexpensively be adapted for use on other helmets having different brim shapes by providing a different hook member 20 configured for the particular helmet. Once the flip-up mount 16 is secured to the helmet, the night vision goggle 140 is attached by inserting the tang 139 into recess 138, and pivoting the goggle to its use position seen in FIG. 1. As so positioned the bar magnet member 160 is positioned to maintain the goggle 140 turned on once the operator 10 switches it on. When the operator 10 flips the goggle up to its position seen in FIG. 4, the goggle is automatically turned off, as explained above. However, in the event the operator does not fully engage the detent features (tongue 168 and rib 172) in this flipped-up position of the goggle, the goggle will not fall freely down but will still be supported because of the selected frictional engagement of the journal member 63 in bushing 62.

In view of the above, it is easily appreciated that the present flip-up helmet mount additionally provides a very strong, rugged, and reliable mount for the night vision goggle 140, and one which is not frail, easily damaged, or readily impeded or compromised in its operation by the sometimes rough use and severe operating environments encountered in police or military uses, for example. The nested first, second, and third bracket members of the present flip-up helmet mount are individually very strong, and further mutually support one another in the assembled mount 16. The broad-based hook member 20 provides secure mounting of the flip-up mount 16 to the helmet 14, and is yet easily and quickly removed by the simple releasing of the over-center buckle 56. The flip-up mount-16 can be adapted to a variety of helmets easily and cheaply with the simple provision of an appropriately configured hook member 20.

Finally, the magnetic device 148 has only a single moving part, is responsive to and dependent upon only very dependable forces such as gravity and centrifugal force in its operation, does not rely for its operation on any other mechanization, such as links, springs, levers, or gears, for example, and is consequently very reliable in its operation. Additionally, the magnetic device 148 is totally closed to environmental contaminations and well endures the rough handling and severe operating environments which may be encountered in the use of the night vision goggle 140 and flip-up mount 16.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. Accordingly, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A flip-up head mount for a night vision device having a magnetically-responsive switching device effective to maintain said night vision device switched on under the influence of a magnetic field provided by said mount, said flip-up head mount comprising:

first support means for being supported from a human user's head;

second support means carried by said first support means for supporting said night vision device alternatively in a use first position in front of said user's eyes, and in a flipped-up second position above a line of sight of said user; and gravitationally, responsive magnetic means moving in response to movement of said second support means between said first and second positions between a corresponding first location providing said magnetic field to said magnetically-responsive switching device and a second location in which said magnetic means does not provide said magnetic field to said switching device;

wherein said gravitationally-responsive magnetic means includes said second support means having a housing portion defining a cavity, and a magnetic member moving in said cavity under the influence of gravity;

wherein said cavity has corresponding first portion adjacent to said magnetically-responsive switching device, and a second portion spaced from said switching device;

wherein with said head mount generally oriented for a horizontal view with said night vision device said cavity extends upwardly and rearwardly from said first cavity portion to said second portion thereof;

wherein said cavity generally has an S-shape in side elevation view.

2. The flip-up head mount of claim 1 wherein said cavity further includes a re-entrant cove portion at a lower extent thereof, said re-entrant cove portion at least in part defining said first portion thereof.

3. The flip-up head mount of claim 2 wherein said re-entrant cove portion of said cavity cooperates with a remainder thereof to give said cavity a question mark shape (?) in side elevation view.

4. The flip-up head mount of claim 3 wherein said housing further defines a lip portion interposing between said re-entrant cove portion of said cavity and said remainder thereof.

5. The flip-up head mount of claim 4 wherein said lip is effective to prevent said magnetic means from moving out of said first location and toward said second location thereof even when said flip-up head mount is oriented for a vertically upward view with said night vision device.

6. The flip-up head mount of claim 3 wherein said question mark shape of said cavity is inverted in said first use position of said second support means, said question mark shape first portion having a lower curlicue portion connecting the reminder of said cavity with said cove, and said magnetic member moving in said cove and in said lower curlicue portion of said cavity to remain proximate to said magnetically-responsive switching device in said first use position of said second support means irrespective of position of said user's head between a vertically downward view and a vertically upward view with said night vision device.

7. The flip-up head mount of claim 1 wherein said magnetic member includes a permanent magnet member moving in said cavity under the influence of gravity between said first and second cavity portions.

8. The flip-up head mount of claim 7 wherein said cavity is elongate laterally and said permanent magnet member has an elongate round cylindrical shape to rollingly move in said cavity.

9. The flip-up head mount of claim 1 further including selectively frictional pivot means for pivotally connecting said second support means to said first support means and from said human user's head.

10. The flip-up head mount of claim 9 wherein said selectively frictional pivot means includes one of said first support means and said second support means defining a boss having a through bore, a journal member rotationally and frictionally received in said bore, the other of said first support means and said second support means defining means for drivingly coupling with said journal member for pivotal movement in unison therewith.

11. The flip-up head mount of claim 10 wherein said second support means pivotally carries a third means for supporting said night vision device for tilting movement relative to said user's eyes, said third means for supporting being pivotal on said second support means about a tilt axis spaced from said journal member, said journal member defining a through bore, a locking member received in said through bore of said journal member and lockingly engageable with said third means for supporting to retain said third means for supporting in a selected position of tilt relative to said tilt axis and said user's eyes.

12. The flip-up head mount of claim 11 wherein said locking member includes a shaft threaded at a protruding end portion thereof, and a locking knob threadably received on said shaft and lockingly engageable with said third means for supporting said night vision device to prevent tilting relative motion thereof.

13. The flip-up head mount of claim 12 wherein said third means for supporting said night vision device defines an arcuate slot through which passes said shaft, said locking knob engaging said third means for supporting said night vision device adjacent to said slot.

14. The flip-up head mount of claim 13 wherein said shaft includes a key feature, said second support means including a key-receiving feature to allow a selected lateral motion for said shaft while preventing rotational motion relative to said third means for supporting said night vision device.

15. The flip-up head mount of claim 10 wherein said journal member includes a key at an end thereof, said other of said first means for being supported and said second support means defining a key way drivingly receiving said key.

16. The flip-up head mount of claim 1 wherein said first means for being supported by a human user's head includes a first bracket member pivotally carrying said second support means, said first bracket member defining an abutment surface for supportingly engaging a helmet worn by said user, said first bracket member further defining a mounting surface for removably attaching a broad-based hook member thereto, said hook member including a pair of hook portions spaced laterally apart and configured to engage a brim portion of said helmet.

17. The flip-up head mount of claim 16 wherein said hook member includes a flange portion extending generally vertically, said flange portion lying adjacent to said mounting surface, and means for removably attaching said flange portion to said mounting surface of said first bracket member.

18. The flip-up mount of claim 17 wherein said flange portion defines a plurality of vertically spaced holes, said mounting surface defining a plurality of holes aligning with selected ones of said plurality of holes of said flange portion, and a plurality of threaded fasteners receivable through selected ones of said holes of said flange portion and threadably engaging said first bracket member at said holes thereof to removably retain said hook member thereto and also for providing vertical adjustment of position of said first bracket member relative to the brim of said helmet.

19. A method of selectively maintaining on and for automatically effecting turning off of a night vision device having a magnetically-responsive switching device which maintains said vision device on only so long as a magnetic field of sufficient strength is applied thereto, said vision device being carried on a support structure mounting to a human user's head and disposing said vision device in a first use position in front of at least one of the user's eyes and said support structure providing for moving of said vision devise to a second position affording the user natural vision unobstructed by said vision device, said method comprising the steps of:

providing a magnetic member in a first location proximate to said switching device and supplying thereto said magnetic field of sufficient strength, said magnetic member being movable to a second location spaced enough away from said switching device that the effective magnetic field from said magnetic member decreases to less than said sufficient field strength, thereby effecting turning off of said vision device, and gravitationally moving said magnetic member respectively between said first and said second locations in response to movement of said vision device between said first and second positions;

additionally including the steps of providing said support structure with a housing portion within which said magnetic member is movable, and disposing said housing portion adjacent to said magnetically-responsive switching device;

wherein said housing structure is provided with a cavity movably receiving said magnetic member, and said cavity has respective portions which correspond to said first and second locations of said magnetic member;

further including the step of configuring said cavity to have generally an S-shape in side elevation view.

20. The method of claim 19 additionally including the steps of providing said cavity with a lower re-entrant cove portion separated from a remainder of said cavity by a lip, said cove portion cooperating with said remainder of said cavity to give an inverted question mark shape in side elevation view.

21. The method of claim 20 further including the step of configuring said magnetic member to have an elongate round cylindrical shape, and rollingly moving said magnetic member in said cavity in response to gravitational force.

22. The method of claim 19 including the step of additionally applying centrifugal force to said magnetic member in response to a rapid "flipping-up" movement of said vision device between said first and second positions, to dislodge said magnetic member from its first location and move said magnetic member toward said second location earlier in said movement of said night vision device from said first toward said second positions than would be the case were gravity alone to be acting on said magnetic member, thereby effecting an early turning off of said night vision device.

23. A method of selectively maintaining on and for automatically effecting early turning off of a night vision device having a magnetically-responsive switching device which maintains said vision device on only so long as a magnetic field of sufficient strength is applied thereto, said vision device being carried on a support structure mounting to a human user's head and disposing said vision device in a first use position in front of at least one of the user's eyes, and said support. structure providing for pivotal moving of said vision device to a flipped-up second position affording the user natural vision unobstructed by said vision device, said method comprising the steps of:

providing a magnetic member in a first location proximate to said switching device and supplying thereto said magnetic field of sufficient strength, said magnetic member being movable to a second location spaced enough away from said switching device that the effective magnetic field from said magnetic member decreases to less than said sufficient field strength, thereby effecting turning off of said vision device, and employing a combination gravity and centrifugal force in said pivotal motion of said night vision device from said first position toward said second position to dislodge said magnetic member from said first location and to start an movement of said magnet member toward said second location than would be the case were gravity along to move said magnetic member between its first position and its second position; and using said earlier movement of said magnetic member to effect a correspondingly earlier turning off of said night vision device;

disposing said magnetic member in a cavity having an inverted question mark shape in cross section, the lower curlicue of said question mark shape defining said first location for said magnetic member, and said second location for said magnetic member being defined at the upwardly extending tail of said inverted question mark shape.

24. A night vision device comprising:

a flip-up mount for a night vision viewer;

said night vision viewer having a magnetically-responsive switching device maintaining said viewer switched on only so long as said device is subject to a sufficient magnetic field, and effecting turning off of said viewer when said device is no longer subject to said sufficient magnetic field;

said flip-up mount including means for being supported from a user's head, and pivot means for allowing movement of said viewer between a first use position in front of at least one of said user's eyes, and a second flipped-up position in which said viewer is disposed above said user's line of sight;

said flip-up mount including magnetic means for providing said sufficient magnetic field to said magnetically-responsive switching device in said first use position of said viewer; and gravitationally-responsive means for moving said magnetic means away from said magnetically-responsive switching device in response to movement of said viewer to said flipped-up position so that said device is no longer subject to a sufficient magnetic field and said viewer is switched off;

wherein said flip-up mount further includes:

a first bracket which secures to a helmet worn by said user, said first bracket defining a transverse boss in which is pivotally and frictionally carried a bushing member defining an axis of flip-up motion;

a second bracket member which drivingly engages said bushing member and which includes a pair of spaced apart flanges straddling the first bracket member for flip-up movement relative thereto with pivoting of said bushing member in said boss, adjacent to forward ends of said pair of flanges of the second bracket member the latter being joined to one another by a web for pivotal movement in unison;

a third bracket member including a pair of flanges straddling and lying adjacent to said pair of flanges of said second bracket member, said second bracket member tiltingly carrying said third bracket member and also carrying a locking member passing through both said bushing member and actuate slots defined by said pair of flanges of said third bracket member, said locking member being effective to clamp said second and said third bracket members together in a selected position of tilt of said night vision viewer relative to said user's helmet, said flanges of said third bracket member also joining to one another in a respective web for simultaneous tilting movements;

a pair of forwardly extending guide ways one of which is carried by a respective one of the pair of flanges of said third bracket member;

a carriage member slidably carried on said guide ways of said third bracket member, said carriage member defining a socket with which said night vision viewer is supported on said flip-up mount, said carriage member also carrying said magnetic means and said gravitationally responsive means; wherein said carriage member includes a housing portion adjacent to said recess for supporting said night vision viewer, said housing portion defining a cavity at its lower extent adjacent to said magnetically responsive switching device, said cavity extending upwardly and rearwardly to a portion thereof sufficiently spaced from said magnetically-responsive switching device, a magnetic member movably received in said cavity, and means for sealingly closing said cavity to exclude environmental contaminants therefrom; and wherein said cavity has a general S-shape in side elevation view.

25. The night vision device of claim 24 wherein said cavity includes a lower cove portion communicating with the remainder of said cavity via a curlicue portion and separated from the remainder of said cavity by a lip, said cavity having the shape of an inverted question mark in side elevation view.

26. The night vision device of claim 24 wherein said cavity is laterally elongate, and said magnetic member has an elongate round cylindrical shape, said magnetic member being rollingly movable in said cavity.

27. The night vision device of claim 24 wherein said carriage housing portion and said cavity thereof are so spaced from and disposed relative to said boss and the axis of flip-up motion defined thereat that a centrifugal force in addition to gravity is effective on said magnetic member during rapid flipping-up motion of said night vision viewer from said first position toward said second flipped-up position thereof, whereby an earlier movement of said magnetic member away from said magnetically-responsive switching device is effected than if gravity alone were moving said magnetic member away from said magnetically-responsive switching device.

* * * * *